July 6, 1965   V. H. PRESTEL   3,193,815
ELECTRICALLY CONDUCTIVE PARTICLE INDICATOR
FOR ELECTRICALLY NON-CONDUCTIVE FLUIDS
Filed May 7, 1962

INVENTOR.
Val H. Prestel
BY
Paul J. Ethington
ATTORNEY

United States Patent Office 3,193,815
Patented July 6, 1965

3,193,815
ELECTRICALLY CONDUCTIVE PARTICLE INDICATOR FOR ELECTRICALLY NON-CONDUCTIVE FLUIDS
Val H. Prestel, Indianapolis, Ind., assignor to General Motors Corporation, Detroit, Mich., a corporation of Delaware
Filed May 7, 1962, Ser. No. 192,718
2 Claims. (Cl. 340—236)

This invention relates to means for indicating the presence of particles of electrically conductive material and for destroying the particles.

Particle indicators are well known in the prior art and are frequently used in conjunction with fluid filled tanks or the like for indicating the presence of loose metal particles in the fluid. One form of particle indicator comprises a plug member having a hollow steel casing with a permanent magnet mounted therein and insulating means separating the casing from the magnet. The plug is adapted to be mounted to a fluid filled tank whereby the casing and magnet are exposed to the fluid. An electrical circuit including indicating means is connected with the casing and magnet. Thus, ferrous particles in the fluid are attracted by the magnet and if large enough complete an electrical circuit with the casing whereby the indicating means is operative to develop an indicating signal. The tank is then dismantled and the particles are removed from the plug. However, such particle indicators have the disadvantage in that they indicate the presence of particles regardless of size and thus frequently require needless dismantling of the tank when small harmless particles are indicated.

In accordance with this invention, means are provided for indicating the presence of electrically conductive particles and for destroying particles smaller than a predetermined size. This is accomplished by using two conductive members which are insulated from each other. A first circuit is provided including indicating means and is connected with the members whereby upon an electrically conductive particle bridging the members the indicating means will be operative to develop an indicating signal. A second circuit is associated with the members whereby when the second circuit is energized the electrical potential across the members is increased. Accordingly, if electrically conductive particles smaller than a predetermined size bridge the members and the second circuit is energized the particles will be destroyed.

A more complete understanding of this invention may be had from the detailed description which follows taken in conjunction with the accompanying drawings in which.

Figure 1:
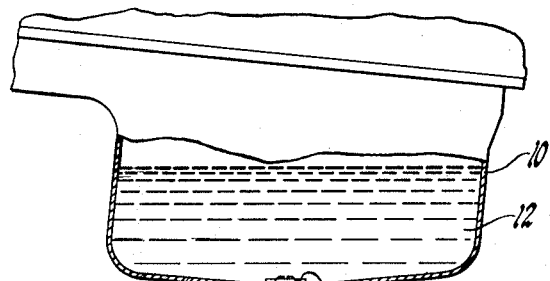
FIGURE 1 is an elevational view partly in section of a fluid filled casing illustrating one application of the invention.
Figure 2:
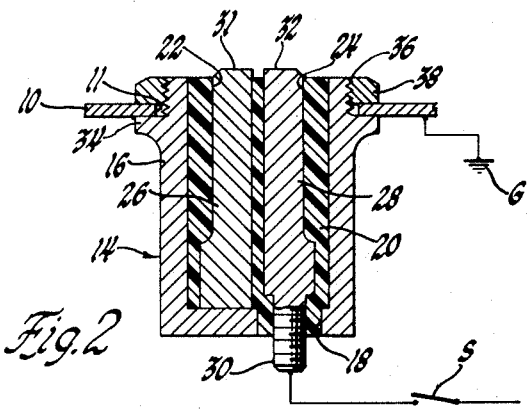
FIGURE 2 is an enlarged view partly in section of a magnetic plug which may be used in conjunction with the application of the invention shown in FIGURE 1.

Referring now to the drawings and more particularly to FIGURES 1 and 2 there is shown a steel casing 10 filled with fluid 12 containing electrically conductive particles which are to be destroyed. A magnetic plug 14 is mounted to the casing whereby a portion thereof is exposed to the fluid 12. The plug 14 comprises a cylindrically shaped steel casing 16 open at one end and having an aperture 18 in the other end. The interior of the casing 16 is filled with insulating material 20 having spaced apertures 22 and 24 therein. The aperture 22 contains a permanent magnet 26 which is securely mounted to the casing 16 so as to make good electrical contact therebetween. The aperture 24 contains a permanent magnet 28 having a terminal end 30 extending through the aperture 18. The magnets 26 and 28 are provided with shoulders 31 and 32, respectively, which extend beyond the insulating material 20 at the open end of the casing 16. The exterior of the casing 16 has formed thereon an annular shoulder 34 which is adapted to abut the periphery of a suitable aperture 11 in the casing 10. In addition, the exterior of the casing 16 has a screw thread 36 formed thereon near the open end of the casing and adapted to receive a nut 38. In assembly with the steel casing 10, as shown in FIGURE 2, the nut 38 securely mounts the casing 16 to the casing 10 so as to insure good electrical contact therebetween. The magnet 26 is connected with ground G via the casing 16 and the casing 10. The magnet 28 is connected with the circuit shown in FIGURE 3 via switching means S.

Figure 3:
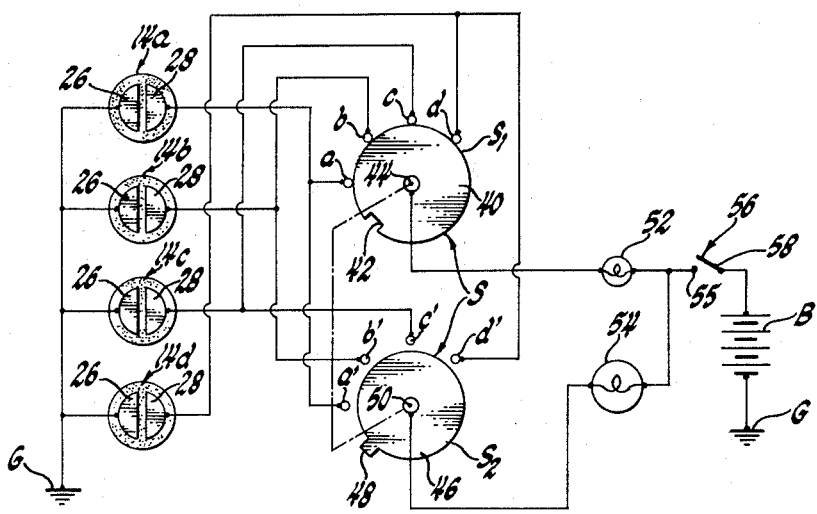
FIGURE 3 is a schematic circuit diagram of one embodiment of the invention.

In FIGURE 3, there is shown a schematic circuit diagram of one embodiment of the invention using magnetic plugs $14_a$, $14_b$, $14_c$ and $14_d$, each identical to the magnetic plug 14 shown in FIGURE 2. The magnet 26 of each plug is connected with ground G. The switching means S which is shown as a single movable contact and a single stationary contact in FIGURE 2 comprises a normally closed switch $S_1$ and a normally open switch $S_2$. The switch $S_1$ includes a disc shaped contact 40 having an indentation 42 in the periphery thereof. The contact 40 is rotatable about its axis of symmetry 44. Stationary contacts $a$, $b$, $c$ and $d$ are uniformly spaced about the periphery of the disc 40 so as to be normally in contact therewith. The switch $S_2$ includes a disc shaped contact 46 having a portion 48 extending radially from the periphery thereof. The contact 46 is rotatable about its axis of symmetry 50. Stationary contacts $a'$, $b'$, $c'$ and $d'$ are uniformly spaced about the periphery of the contact 46 so as to be selectively engaged by the portion 48 as the contact 46 is rotated about axis 50. The contacts 40 and 46 are mechanically interconnected whereby they rotate together such that the indentation 42 and the portion 48 simultaneously break and make contact, respectively, with the stationary contacts $a$, $b$, $c$ and $d$ and $a'$, $b'$, $c'$ and $d'$ in that sequence as the contacts 40 and 46 are rotated clockwise in FIGURE 3. The magnets 28 of the plugs $14_a$, $14_b$, $14_c$ and $14_d$ are respectively connected with the stationary contacts $a$ and $a'$, $b$ and $b'$, $c$ and $c'$ and $d$ and $d'$. A lamp 52 and a lamp 54 of substantially lower resistance than the lamp 52 are respectively connected between the contacts 40 and 46 and a stationary contact 55 of a switch 56. A voltage source B is connected between ground G and a movable contact 58 of the switch 56.

The plus $14_a$, $14_b$, $14_c$ and $14_d$ may be mounted to the casing 10 in the manner shown in FIGURE 2 at desired locations. The magnets 26 and 28 of each plug will attract ferrous particles or other particles of magnetic material in the fluid 12 whereby certain of the particles will bridge the shoulders 31 and 32 of the magnets 26 and 28, respectively. When an electrically conductive particle bridges the magnets 26 and 28 of either of the plugs $14_a$, $14_b$, $14_c$ or $14_d$ an electrical circuit will be completed from the source B, the switch 56, the lamp 52, the contact 40, the respective contact $a$, $b$, $c$ or $d$, the magnet 28, the particle, the magnet 26 to ground G whereby the lamp 52 will glow. An operator may now rotate the contacts 40 and 46 so as to sequentially engage the portion 48 with the contacts $a'$, $b'$, $c'$ and $d'$. Upon engagement of the portion 48 with the contact $a'$ the contact 40 will break contact with contact $a$ and if only the magnets 26 and 28 of plug $14_a$ are bridged by an electrically conductive particle the lamp 52 will cease to glow. An electrical circuit will now be completed from the source B, the switch 56, the lamp 54, the portion 48 of the contact 46, the contact a', the magnet 28, the particle, the magnet 26 to ground G. Since the resistance of the lamp 54 is substantially less than that of the lamp 52 the potential across the magnets 26 and 28 of the plug 14 will increase and hence the current flowing through the particle will increase. If the particle is small enough the current will be sufficient to destroy the particle. However, if the particle is too large the lamp 54 will continue to glow. The operator monitoring the lamps 52 and 54 will then take such emergency procedures as may be required, i.e. dismantling the casing 10, removing the liquid 12, and cleaning the plug $14_a$.

If the magnets 26 and 28 of plug $14_a$ are not the only magnets bridged by a conductive particle the lamp 52 will continue to glow when the portion 48 of contact 46 engages the contact a'. The operator will then rotate the contacts 40 and 48 so as to sequentially destroy particles bridging the magnets 26 and 28 of plugs $14_b$, $14_c$ and $14_d$ in the manner as described above.

Although the description of this invention has been given with respect to a particular embodiment, it is not to be construed in a limiting sense. Numerous variations and modifications within the spirit and scope of the invention will now occur to those skilled in the art. For a definition of the invention, reference is made to the appended claims.

I claim:

1. A device for indicating the presence of electrically conductive particles in any one of a plurality of containers of nonelectrically conductive fluid and for determining whether the particles have a predetermined current-carrying capaicty, said device comprising a D.C. source, a particle detector located respectively in each of said plurality of containers and including two magnetized elements of electrically conductive material separated by insulating means, a first indicating lamp, switching means connecting each of said detectors in series with said first lamp across said source whereby said lamp is energized when an electrically conductive particle bridges said members, a second lower resistance indicating lamp, said switching means operable to connect said second lamp between said source and any one of said detectors to apply said predetermined current thereto while simultaneously disconnecting said first lamp from said one of said detectors to thereby indicate the existence of a particle of greater than said predetermined current-carrying capacity.

2. A device for indicating the presence of electrically conductive particles in any one of a plurality of containers of non-electrically conductive fluid and for determining whether the particles have a predetermined current-carrying capacity, said device comprising a D.C. source, a particle detector located respectively in each of said plurality of containers and including two magnetized elements of electrically conductive material separated by insulating means, a first indicator lamp, a rotary switch normally connecting each of said detectors in series with said first lamp across said source whereby said first lamp is energized when an electrically conductive particle bridges said members, a second lower resistance indicating lamp, a second rotary switch mechanically coupled to said first switch and adapted to selectively connect said second lamp in series with said source and any one of said detectors while simultaneously disconnecting said first lamp from said one of said detectors to apply said predetermined current to said particle to thereby indicate the existence of a particle having greater than said predetermined current-carrying capacity.

References Cited by the Examiner

UNITED STATES PATENTS

| 2,450,630 | 10/48 | Bourne | 340—270 XR |
| 2,865,083 | 12/58 | Kater et al. | 29—25.42 |
| 2,878,342 | 3/59 | Arthur | 340—270 XR |
| 3,042,907 | 7/62 | Redway | 324—65 XR |

NEIL C. READ, *Primary Examiner.*